United States Patent [19]
Leblond

[11] 3,772,125
[45] Nov. 13, 1973

[54] TIRE BUILDING DRUM HAVING A CARCASS PLY SUPPORT AND FOLDOVER MECHANISM

[76] Inventor: Jean Leblond, 5 bis rue du Lieutenant, Ducloux, Compiegne, France

[22] Filed: Sept. 7, 1971

[21] Appl. No.: 178,134

[30] Foreign Application Priority Data
Sept. 9, 1970 France.......................70.32770

[52] U.S. Cl.................. 156/402, 156/132, 156/133, 156/414, 156/405, 156/400
[51] Int. Cl........................ B29h 17/16, B29h 17/22
[58] Field of Search.................... 156/398, 400, 403, 156/405, 414, 402, 415, 421, 126, 131, 132, 135

[56] References Cited
UNITED STATES PATENTS

| | | | |
|---|---|---|---|
| 3,694,290 | 9/1972 | Pacciarini et al................. | 156/126 |
| 3,676,261 | 7/1972 | Apploby et al..................... | 156/403 |
| 3,232,817 | 2/1966 | Nadler et al........................ | 156/132 |
| 3,374,138 | 3/1968 | Porter et al..................... | 156/132 X |
| 3,560,301 | 2/1971 | Cantavutti........................ | 156/403 |

Primary Examiner—Alfred L. Leavitt
Assistant Examiner—C. B. Cosby
Attorney—Jay L. Chaskin

[57] ABSTRACT

A rotatable and axially movable carcass ply support associated with a pneumatic tire building machine or a collapsible rotating tire building drum. The support comprises a ferrule affixed to a ferrule-holder ring wich is able to rotate and slide axially with respect to the ends of the building drum by means of a plurality of roller bearings disposed within the ring. The ferrule-holder ring includes a drive element which cooperates with a servo means to allow axial movement of the ring and the ferrule with respect to the ends of the building drum. Cooperating with the ferrule and ferrule-holder ring is a bead-setting ring and a plurality of carcass ply foldover fingers. The ferrule supports the marginal edges of the carcass ply which may be wider than the building drum. The ferrule is able to rotate with the drum thereby preventing the distortion or twisting of the marginal edges.

19 Claims, 7 Drawing Figures

INVENTOR.
JEAN LEBLOND
BY Jay L Chaskin
ATTORNEY

Patented Nov. 13, 1973
3,772,125
3 Sheets-Sheet 3
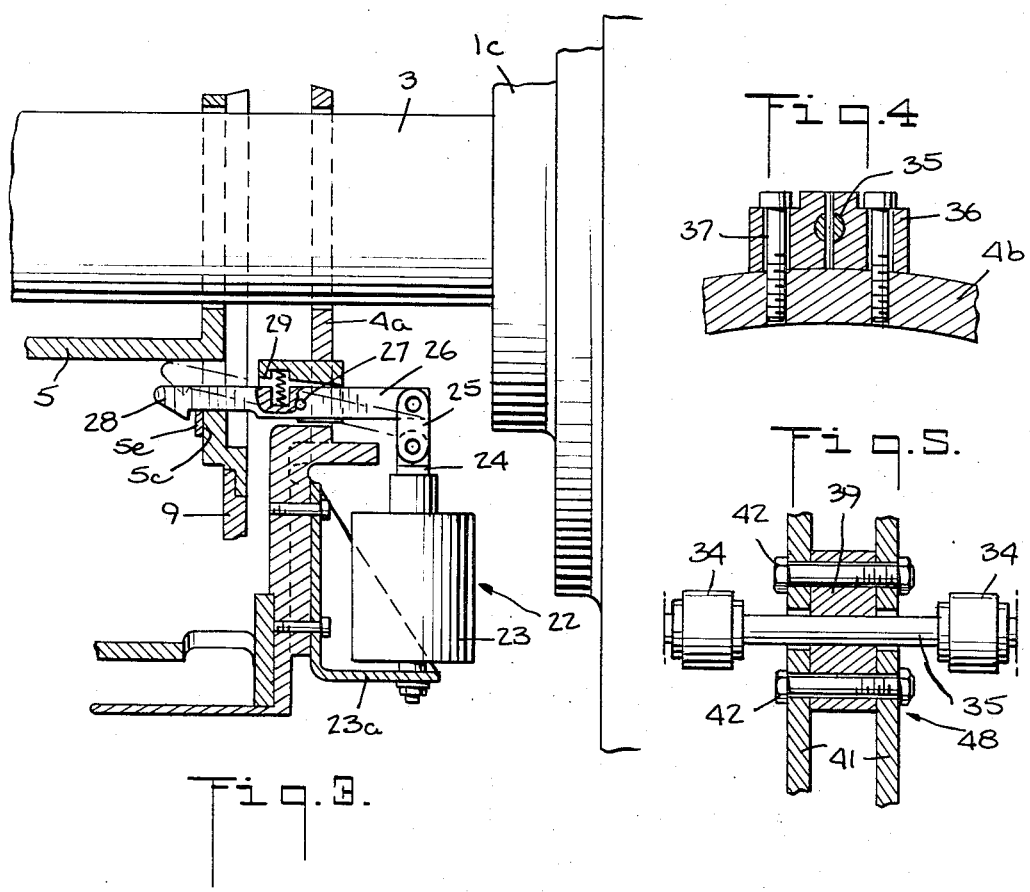
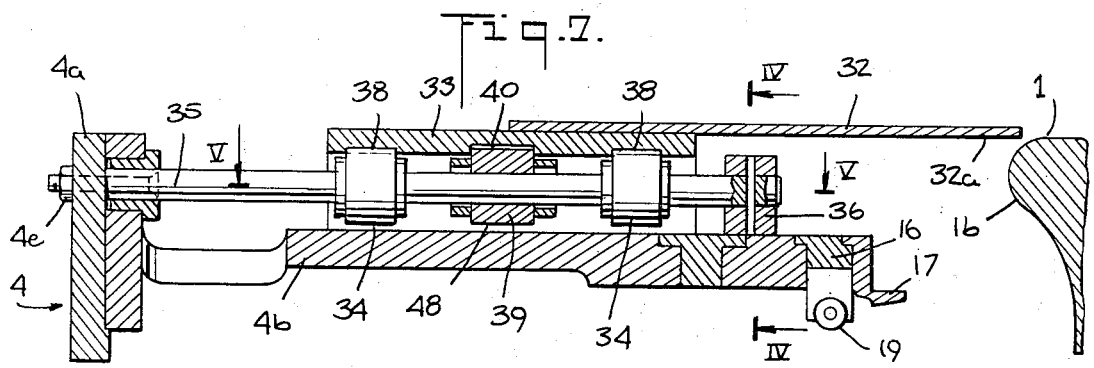
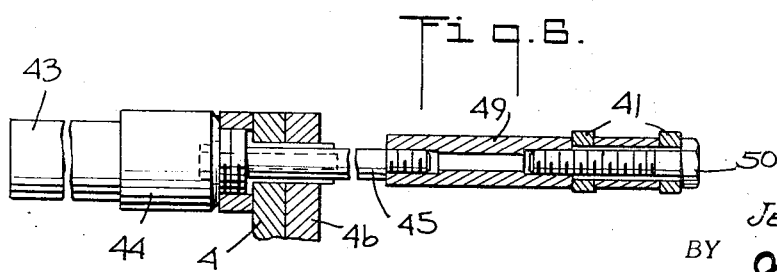
INVENTOR.
JEAN LEBLOND
BY
Jay L Chast
ATTORNEY

TIRE BUILDING DRUM HAVING A CARCASS PLY SUPPORT AND FOLDOVER MECHANISM

The present invention is directed to a rotatable and movable carcass ply support apparatus associated with a pneumatic tire building machine or a collapsible rotating building drum for manufacturing first stage or cylindrical pneumatic tires according to the flat band method.

Machines for manufacturing pneumatic tire carcasses are well known. See, for example, Breth, U. S. Pat. No. 2,313,035, Cantarutti, U. S. Pat. No. 3,560,301 and Cantarutti, U. S. Pat. No. 3,438,832. The general configuration of these machines includes ply foldover devices with mechanical fingers and ferrules connected symmetrically respectively to the longitudinal extremities opposite each end of a carcass building drum and a device that at least temporarily supports the marginal edges of the sheet layer or layers of carcass plies which are wound onto the building drum. The width of the carcass ply exceeds the respective longitudinal extremities of the building drum. Generally, there are a plurality of mechanical fingers arranged in a circular fashion about the circumferential edge of the building drum. This device includes, symmetrically on each end of the building drum a cylindrical carcass layer holder ferrule which is coaxial with the axis of the building drum and essentially of the same external diameter as the building drum. The external lateral surface of the ferrule is essentially aligned with that of the building drum, the ferrule being generally attached to an annular bracket that is integral with the support of the corresponding adjacent finger foldover. Such carcass holder ferrules are necessary because the layers or plies making up a carcass are generally wider than the building drum to which they are applied. Thus it is possible to radially turn the marginal edges of each carcass layer inward or outward with respect to the axis of the building drum so that the reinforcing bead rings may be applied. Thus, in the absence of an appropriate support device it is difficult to ensure the accurate positioning of the marginal edges of the carcass layers for winding onto the building drum. It is therefore, otherwise necessary to hold the carcass layers on each side during their application onto the building drum.

In the above described support device, however, the carcass layer holder ferrules provide a support for the carcass layers during their application onto the building drum. These support devices, however, have the disadvantage of being fixed or stationary with respect to their associated annular bracket, the annular bracket itself being incapable of rotating coaxially with respect to the building drum. When an applied carcass layer rotates with the building drum, the natural adhesive tack of the rubber adheres to the surface of the drum or the ferrule surface or an already wound carcass layer. Since the ferrule does not rotate there is a possibility of causing distortions in the carcass layers due to friction.

It is an object of the present invention to provide a support device for the marginal edges of a carcass ply which is movable with respect to a tire building drum.

It is an object of the present invention to provide a support device for the marginal edges of a carcass ply which is coaxially rotatable with respect to the bracket to which it is connected and the axis of a tire building drum.

It is an object of the present invention to provide a support device for the marginal edges of a carcass ply which is able to move axially inward and outward with respect to the bracket to which it is connected and the end of a tire building drum.

It is an object of the present invention to provide a movable support device which produces a rigid cylindrical surface adjacent the cylindrical surface of a tire building drum in order to position carcass layers which are wider than the drum.

Another object of the present invention is to provide, in combination, with a support device for the marginal edges of carcass ply, a plurality of folding fingers to turn the marginal edges about a bead ring.

In its general form, the present invention comprises a ferrule affixed to a ferrule-holder ring which is able to rotate and slide coaxially with respect to the ends of the building drum by means of a plurality of roller bearings disposed within the ring. The axial movement of the ferrule holder ring is guided by a rod passing through the roller bearings. The roller bearings are preferably arranged in at least two circumferential rows in an annular internal groove within the ferrule-holder ring. The ferrule-holder ring also includes a plurality of annular segments or circular cross section drive elements which are disposed in an annular groove within the ring and surrounds the guide rod. The drive elements cooperate with a servo means to allow the axial movement of the ferrule and ferrule-holder ring with respect to the ends of the building drum.

The invention will be better understood and other characteristic aims, details, and advantages will appear more clearly upon reading the explanatory description that follows, referring to the attached schematic drawings, in which:

FIG. 3 shows a partial cross-sectional view of the automatic bolting and controlled unbolting mechanism used to attach the carcass layer supportbracket with its associated finger foldover;

FIG. 4 is a partial cross-sectional view taken along line IV—IV of FIGS. 1 or 7;

FIG. 5 is a partial cross-sectional view taken along line V—V of FIGS. 1 or 7;

FIG. 6 is a partial cross-sectional view of the fluid pressure drive means for the carcass layer holder ferrule; and FIG. 7 is similar to FIGS. 1 and 2 and shows a partial cross-sectional view of a carcass layer holder ferrule in a different operative position from that represented in FIGS. 1 and 2, and in sliding juxtaposition with the carcass building drum.

Figure 1:
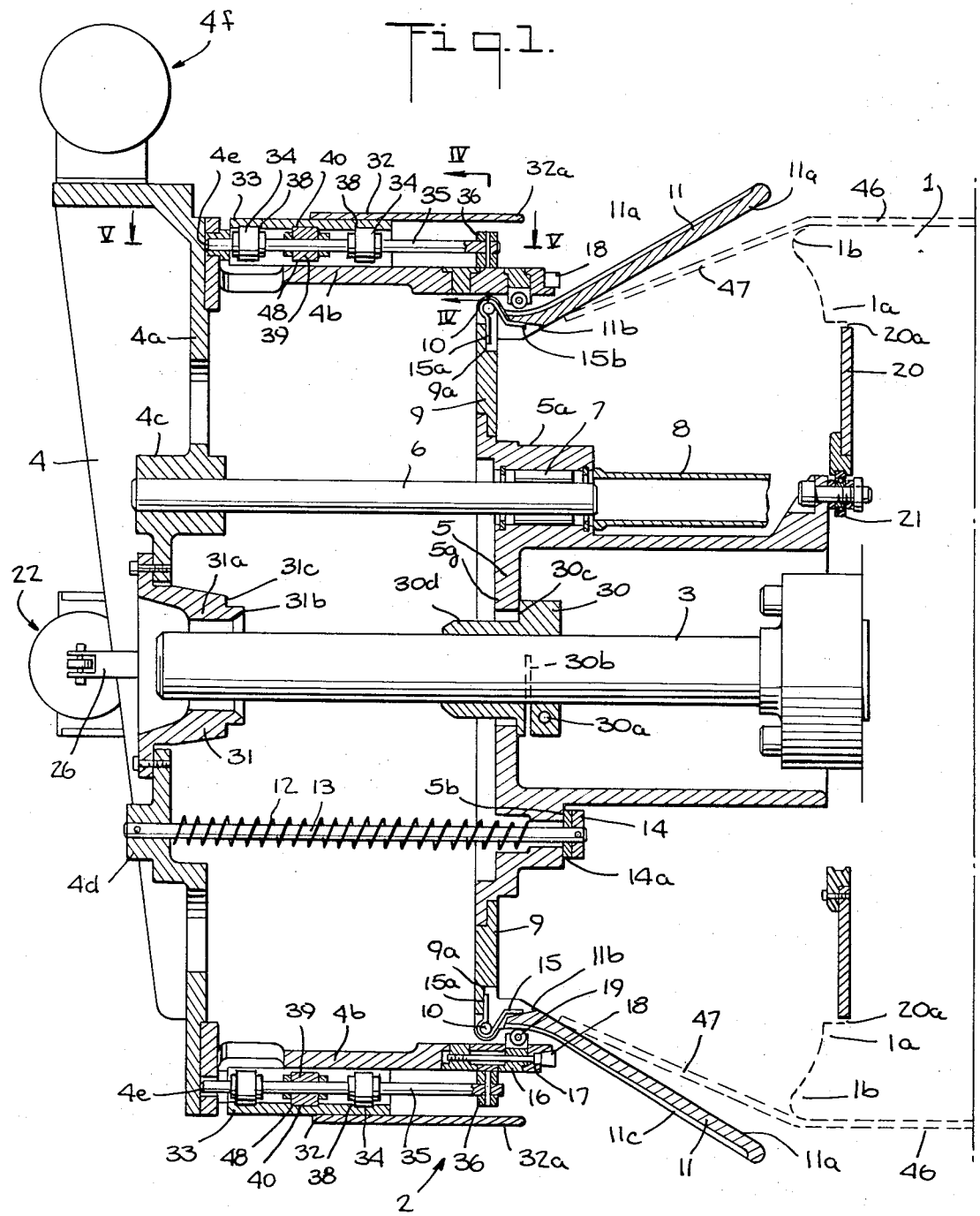
FIG. 1 shows a partial cross-sectional half-view of a building drum with its associated finger foldover together with the carcass layer support device in one operative position in accordance with the invention.
Figure 2:
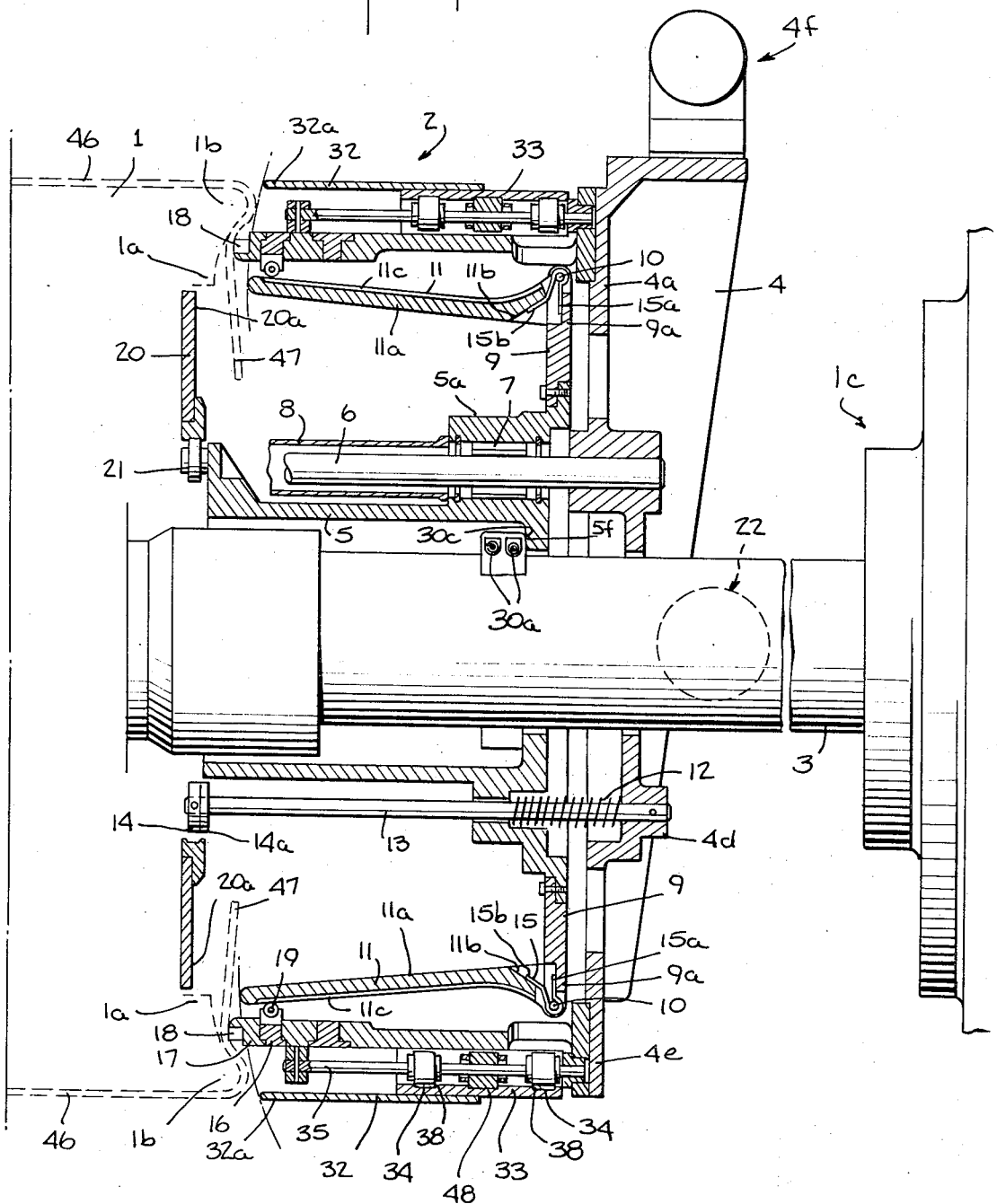
FIG. 2 is similar to FIG. 1 except it shows the other end of the building drum and the fingers foldover and carcass layer support device in another operative position.

Referring to FIGS. 1 and 2 there is shown a carcass building drum 1 and finger foldover and carcass layer support mechanism 2 arranged symmetrically with respect to the median vertical transverse plane of the drum 1 and located adjacent the respective ends of the drum 1. The mechanism is generally symmetrical about a horizontal rotation axis which passes through a shaft 3 of the tire building machine. Each of the above mechanisms is supported by a support means 4 having a planar support 4a and a cylindrical extension 4b that is essentially coaxial with respect to drum 1. A hub 5 in the form of a sleeve or a bushing is guided in axial translation by a plurality of rods 6 (only one of which is shown) which are parallel to the rotation axis of drum 1. One end of rod 6 passes through a flange 4c of the planar support and is affixed thereto. Hub 5 is capable of moving in a sliding fashion on rods 6 by the use of roller bearings 7 located in suitable borings in a hub flange 5a. Extending from hub flange 5a are tubes 8, which protect rods 6.

Attached to and concentric with hub flange 5a is a finger-holding ring 9 in the form of an annular disc. A plurality of mechanical fingers 11 are attached by journal 10 to the circumferential periphery of disc 9 and act as carcass ply foldover means. The fingers 11 are shaped so that when the mechanism 2 is in the axially extended operative position represented on FIG. 1, they have an internal surface 11a which is essentially conical, with a fairly large angle at the peak. When the mechanism 2 is in the axially retracted operative position as represented on FIG. 2, the fingers 11 bound an internal conical surface 11a having a small peak angle.

Compression spring means 12 helically arranged about and guided by appropriate rods 13 provide a constant positive force on hub 5 which force tends to urge the hub 5 and the support means 4 axially from each other. Unless mechanically restrained the mechanism 2 would assume the axially extended operative position represented on FIG. 1. The rods 13 are integral with the support means 4 in a flange 4d and are parallel to the axis of rotation of drum 1. The axially extended limit of the mechanism 2 is defined by the lugs 14 which are integral with respective free ends of rods 13. When the mechanism 2 is axially extended, surface 5b of hub 5 comes into contact with the multilayered washer 14a disposed on rod 13. Each mechanical finger 11 is urged in a radially outward direction by a leaf-spring 15 disposed on the journal 10. One leaf 15a of spring 15 is disposed against a flange surface 9a and the other leaf 15b is disposed against finger surface 11b.

A roller-support 16 and a bead setting means 17 are fixed to the peripheral edge of cylindrical extension 4b. Support 16 and bead setting means 17 provide a conveying means for carcass bead ring 18 which is shown in position on the bead setting means 17 in FIGS. 2 and 7. Roller support 16 holds a plurality of rollers 19 which are uniformly arranged about the radially internal contour of support 16 and are in constant rolling contact with respective mechanical fingers 11. Rollers 19 provide a means for controlling the radial movement of the fingers 11. Mechanical fingers 11 are held against rollers 19 by respective leaf-springs 15. As the mechanism 2 is axially retracted, i.e., as hub 5 approaches planar support 4a, roller 19 moves along outer surface 11c of each mechanical finger 11 and causes the finger 11 to rotate radially inward about the journal 10 and against the force of leaf-spring 15.

Disposed at each opposite end of each hub 5, i.e., the end of the hub adjacent the side of building drum 1, is a folding element 20 which is part of a carcass ply turn-up mechanism which is coaxial with respect to hub 5 on ball or roller bearings 21. Such ply turn-up mechanisms are well-known, and an embodiment of such a mechanism is described in Breth, U. S. Pat. No. 2,313,035. Such a ply turn-up mechanism includes a rotatable folding member which is coaxial with shaft 3. The circumferential outer ends of the folding member are formed into segmented axially movable radially extendable folder elements such as shown at 20 in FIGS. 1 and 2. When appropriately mechanically actuated the folder elements 20 may initially move radially inward in order to avoid shoulder 1a of building drum 1; then axially outward until the edge 20a contacts the folded over marginal edge 47 of a carcass ply. The folding elements continue to move axially outward as well as radially outward so as to turn-up the marginal edge 47 about bead ring 18. Instead of a folding element 20, the ply turn-up mechanism may be such as that described in Cantarutti, U. S. Pat. No. 3,438,832 or Cantarutti, U. S. Pat. No. 3,560,301. In these U. S. patents, a turn-up device is described which uses inflatable bladders.

Connecting means 22 are provided to automatically bolt support means 4 with hub 5 when support means 4 and hub 5 are in the axially retracted operative position as shown in FIG. 2. As shown in particular in FIG. 3, the connecting means 22 comprises a solenoid 23 attached to support 4a by a bracket 23a. Solenoid 23 contains a plunger shank 24, the end of which is pivotably connected by an intermediary link 25 to one end of an oscillating bolting lever 26. Lever 26 is attached to support 4a at pivot 27. The free end 28 of lever 26 is hook-shaped and is capable of catching the edge 5c of an orifice 5d provided in hub 5 when the lever penetrates the orifice. The edge 5c is provided with a protective washer 5e. Automatic bolting is achieved by means of a spring 29 depressing the lever 26 and causing hub 5 and support means 4 to be mechanically joined when the mechanism 2 is in the axially retracted operative position. Hub 5 is automatically disconnected from support means 4 by electromagnetic control of solenoid 23. When desired an electric signal energizes the solenoid 23 causing the plunger 24 to retract. Lever 26 pivots at 27 against the force of spring 29, releasing end 28 from edge 5c. The disconnect position of lever 26 is shown as a dotted line in FIG. 3.

An axially adjustable lug 30 is rigidly attached to shaft 3 by bolts 30a and is prevented from rotating or slipping along shaft 3 by locking pin 30b. Lug 30 maintains hub 5 in a fixed position on shaft 3 while support means 4 moves axially with respect to the hub. Surface 5f of hub 5 abuts against surface 30c of lug 30 preventing the axial displacement of the hub. A centering means 31, which is coaxial and integral with support means 4, has a bore 31a whose diameter is greater than shaft 3. Shaft 3 is disposed inside bore 31a. The diameter of bore 31a corresponds to the outer diameter of connecting spline 30d of lug 30. When bracket 4 and hub 5 are axially adjacent, as in FIG. 2, with rod 6 disposed within tube 8, bore 31a surrounds spline 30d, such that surface 31b abuts against surface 30c and surface 31c abuts against surface 5g. Support means 4 is therefore stable with respect to shaft 3 and enables the proper coaxial positioning of bead ring 18 by head setting means 17. Extension 4b of each support means 4 supports a carcass ply holder ferrule 32. Ferrule 32 is cylindrical in cross-section and may be formed by a plurality of arcuate sections which surround extension 4b. Each ferrule 32 is coaxial with shaft 3 and is attached to and extend from an annular support forming a ferrule-holder ring 33. A plurality of roller means 34 such as rotating rings or rollers are in rolling contact with the internal surface of ferrule-holder ring 33 and extension 4b. Roller means 34 are preferably distributed in at least one and preferably two spaced circumferential rows. For example, they are mounted in coaxial pairs respectively on guide rods 35 effectively parallel to the rotation axis of buidling drum 1. Roller means 34 are capable of sliding in translation, while they may turn freely around respective rods 35. Each rod 35 is fixed at one end to support means 4 by bolt 4e while its opposite end is attached to flange 36 of extension 4b by bolts 37. All the roller means 34 in the same circumferential row are preferably recessed in common annular groove 38 in the internal wall of ferrule-holder 33. Ferrule-holder 33 may thus turn freely on roller means 34. Ferrule-holder 33 and rollers 34 may thus slide together axially along rods 35.

At least one driving means 48 is provided for the axial translation of the ferrule 32 and ferrule-holder 33. The driving means 48 is preferably formed of at least one and preferably more elements 39, essentially in the shape of circular sections or annular segments. Each element 39 is mounted in a sliding fashion respectively on guide rods 35 and is able to rotate in a corresponding annular groove 40 on the internal wall of ferrule-holder 33. There should preferably be a loose fit between the external periphery of elements 39 and groove 40. Elements 39 are preferably connected to each other so as to form a rigid annular drive ring by clamping between two annular discs 41 (see FIG. 5) and bolts 42. Instead of using elements 39 circumferentially spaced with respect to each other it is also possible to use a continuous annular ring which is then engaged by its radially external and continuous peripheral edge in groove 40. Drive means 48 is connected to a control means comprising a servo-motor means 43, by an appropriate axial translation control means, such as, for example, a linear compressed fluid jack. As shown in FIG. 6, a pneumatically operated servomotor 43 having a cylinder 44 and a piston 43 is attached to support means 4. The operation of the servo-motor means is essentially in a direction parallel to the axis of the building drum 1. Servo-motor piston shaft 45 extends through support means 4 and extension 4b and is attached to discs 41 of drive means 48 by threaded element 49 and screw 50. The linear movement of piston 45 therefore permits the axial movement of ferrule 32. In addition, the ferrule 32 can rotate freely on rollers 34 without interference by drive means 48 since pieces 39 are rotatable in groove 40 of ferrule-holder 33.

In operation, a mechanism 2 is situated at each end of carcass building drum 1. Each mechanism 2 is preferably moved axially in a simultaneous and synchronized fashion that is symmetrical with respect to the median transverse vertical plane of the carcass building drum 1. The axial movement of the mechanism 2 can be mechanically aided by a suitable connection to flange 4f. When in the initial position, hub 5 is in juxtaposition to support 4a and is connected to support means 4 of the connecting means 22. The fingers 11 are thus depressed, i.e., radially inward of ferrule 32, as shown in FIG. 2. Each mechanism 2 is then moved axially adjacent each end of building drum 1 until the external free edge 32a of each ferrule 32 is fixed against drum shoulder 16. The axial width of the drum 1 is therefore increased to support the marginal edge 47 of the carcass ply 46. A carcass ply 46, which may be textile or metal reinforced, is wound onto the drum 1 by rotating the drum by motor means 1c. The adhesion between the ply 46 and the ferrule 32, causes the ferrule 32 to rotate.

Each mechanism 2, including ferrule 32, is then moved axially away from the respective ends of the drum 1. An electric signal is applied to solenoid 23, initiating the disconnecting of each connecting means 22. Hub 5 thus automatically moves axially away from associated support means 4 because of the force exerted by compression spring means 12. Hub 5 moves axially toward the drum 1 until surface 5b comes into contact with the lugs 14, 14a at the end of rod 13. During this movement, fingers 11 are progressively rotated about journal 10 radially outward by springs 15 until fingers 11 are in the operative position as shown in FIG. 1.

Each mechanism 2 is then simultaneously moved axially toward drum 1, so that radially extended fingers 11 come into contact with the marginal edge 47 of carcass ply 46. The marginal edges 47 are folded slightly radially inward until surface 5f on hub 5 comes into contact with surface 30c lug 30, and thus forming a fixed stop for hub 5 with respect to shaft 3. The operative position of each mechanism 2 is now as shown in FIG. 1. Support means 4 of each mechanism 2 continues to advance axially towards the drum 1. Rollers 19 on support 16 thus act on fingers 11 causing them to rotate radially inward towards the axis of shaft 3. The rotation of fingers 11 causes a folding or a turning down of the carcass ply marginal edge 47 about the shoulder 1b of drum 1 as shown in FIG. 2.

As fingers 11 are rotated bead rings 18, previously placed on bead setting means 17, are applied against folded-back part 47 of the carcass ply as shown in FIG. 2. The accurate centering of beads 18 is achieved by axially aligning each support means 4 by centering means 31 on spline 30d of lug 30. Each support means 4 moves axially toward the drum 1 until surfaces 31b and 31c of centering means 31 come into contact with surfaces 30c and 5g of lug 30 and hub 5, respectively. Connecting means 22 is automatically engaged by the penetration of bolting hook 28 in hub 5, thus assuring joining of hub 5 and finger-holding annular disc 9 with support means 4.

Each mechanism 2 is now in the position shown in FIG. 2. Mechanisms 2 are moved axially away from the ends of drum 1. Folding elements 20 are therefore enabled to initiate a radial turn-up of the marginal portion 47 around beads 18. Each mechanism 2 is thus returned to the initial position, thereby permitting a recycling.

After completing the ply folding for as many plies and bead rings as desired, the carcass may be removed from the building drum or remain on the drum for further processing. The building drum may be of a known construction and is preferably radially collapsible and axially movable.

FIG. 7 shows ferrules 32 axially moved by sliding on guiding rods 35 so that ferrule edge 32a is juxtaposed adjacent and aligned with shoulder 16 of drum 1. Fingers 11 are in the radially inward position, although support means 4, and therefore extension 4b, is in a position axially away from drum 1. This position for ferrule 32 is desirable where an initial carcass layer has been previously wound onto drum 1 and has its marginal edges turned towards the outside around the bead ring, and where it is desired to apply a further carcass layer whose marginal edges are to be turned over towards the interior around the bead ring. Ferrule 32 provides a supporting surface for the marginal edges of a further carcass layer. The further carcass layer can then be wound onto a rigid cylindrical surface whose axial width has been temporarily extended by the ferrules.

It will be understood that the foregoing disclosure of the preferred embodiments of the present invention is for purposes of illustration only, and that the various structures and operational features disclosed may be modified and changed in a number of ways none of which involves any departure from the spirit and scope of the invention, as defined in the hereto appended claims.

What is claimed is:

1. A carcass layer support mechanism, for use with a tire building drum rotating about its axis, comprising:
   a support means having an extension coaxial with the axis of said building drum, said support means movable axially of said drum;
   an annular support coaxial with the extension of the support means;
   roller means disposed between and in surface contact with the extension of the support means and the annular support, said roller means for supporting the annular support in rotation about the drum axis and said roller means allowing the annular support to move axially of said drum; and
   a cylindrical ferrule coaxially affixed to the annular support and extending from the annular support in a direction parallel to the drum axis so as to provide an extension of the drum surface to support a portion of a carcass layer being wound about the drum as the drum rotates.

2. A mechanism according to claim 1 wherein the annular support and the extension of the support means are concentric.

3. A mechanism according to claim 1 wherein the roller means comprise a plurality of coaxially spaced rotating rings.

4. A mechanism according to claim 1 wherein the roller means comprises at least two axially spaced, circumferentially arranged rows of rollers.

5. A mechanism according to claim 4 wherein the rollers are mounted in coaxial pairs on a plurality of guide rods, the axis of each guide rod being parallel to the drum rotation axis.

6. A mechanism according to claim 4 wherein the rollers in the same circumferential row are recessed in an annular groove located on an internal wall of the annular support.

7. A mechanism according to claim 1 wherein a drive means is disposed between the support means and the annular support for the axial movement of the ferrule and the annular support.

8. A mechanism according to claim 7 wherein the drive means comprises an element concentric with the annular support, the axis of the annular support being coaxial with the drum rotation axis.

9. A mechanism according to claim 7 wherein the drive means is a plurality of circular sections.

10. A mechanism according to claim 7 wherein the drive means is disposed in an annular groove located on an internal wall of the annular support.

11. A mechanism according to claim 7 wherein the drive means is operated in a direction parallel to the drum rotation axis by a control means.

12. A mechanism according to claim 1 wherein the extension of the support means has a peripherial edge having a bead setting means.

13. A mechanism according to claim 12 wherein the peripheral edge includes means for controlling the radial movement of a plurality of carcass ply foldover fingers.

14. A mechanism according to claim 1 comprising a carcass ply folding means mounted on a hub, said hub supported by said support means, and the axis of said hub being coaxial with the drum axis.

15. A mechanism according to claim 14 comprising connecting means for selectively restraining the axial separation of the hub and the support means.

16. A mechanism according to claim 12 wherein the support means includes a centering means coaxial with the drum axis for the positioning of the bead setting means.

17. A mechanism according to claim 14 wherein the hub and the support means are urged into axial separation by a spring means.

18. A mechanism according to claim 9 wherein the plurality of circular sections are connected to each other so as to form a rigid annular drive ring.

19. A mechanism according to claim 7 wherein the drive means is a continuous annular ring.

* * * * *